(12) United States Patent
Maltagliati et al.

(10) Patent No.: US 9,247,197 B2
(45) Date of Patent: Jan. 26, 2016

(54) SYSTEMS AND METHODS FOR SUBSCRIBER AUTHENTICATION

(75) Inventors: Alan G. Maltagliati, St. Louis, MO (US); James G. Withers, Chesterfield, MO (US); Jesse J. Chounard, II, Ballwin, MO (US)

(73) Assignee: Koplar Interactive Systems International LLC, St. Louis, MO (US)

( * ) Notice: Subject to any disclaimer, the term of this patent is extended or adjusted under 35 U.S.C. 154(b) by 2507 days.

(21) Appl. No.: 11/695,463

(22) Filed: Apr. 2, 2007

(65) Prior Publication Data

US 2007/0226508 A1    Sep. 27, 2007

Related U.S. Application Data

(63) Continuation of application No. 10/888,292, filed on Jul. 9, 2004, now Pat. No. 7,330,511.

(60) Provisional application No. 60/495,902, filed on Aug. 18, 2003.

(51) Int. Cl.
| | |
|---|---|
| *H04N 7/12* | (2006.01) |
| *H04N 7/08* | (2006.01) |
| *H04N 7/18* | (2006.01) |
| *H04N 21/258* | (2011.01) |
| *G07C 5/08* | (2006.01) |

(52) U.S. Cl.
CPC . *H04N 7/08* (2013.01); *H04N 7/18* (2013.01); *H04N 7/185* (2013.01); *H04N 21/25841* (2013.01); *G07C 5/0891* (2013.01)

(58) Field of Classification Search
CPC ... G07C 5/089; H04N 21/25841; H04N 7/08; H04N 7/18; H04N 7/185
See application file for complete search history.

(56) References Cited

U.S. PATENT DOCUMENTS

| | | | |
|---|---|---|---|
| 4,101,927 | A | 7/1978 | Isono et al. |
| 4,503,288 | A | 3/1985 | Kessler |
| 4,540,880 | A | 9/1985 | Hipko |
| 4,620,877 | A | 11/1986 | Skukowski |

(Continued)

FOREIGN PATENT DOCUMENTS

| | | |
|---|---|---|
| EP | 713335 | 5/1996 |
| EP | 1349363 | 10/2003 |

(Continued)

OTHER PUBLICATIONS

Catling I et al: "Using GPS as part of an on-bus video system for bus lane enforcement" Nov. 18, 1996, p. 2/1, XP006509561.

(Continued)

*Primary Examiner* — Nhon Diep
(74) *Attorney, Agent, or Firm* — The Small Patent Law Group LLC; Christopher R. Carroll

(57) ABSTRACT

Systems and methods for authenticating subscribers of video signals are disclosed. In accordance with the various embodiments, a subscriber authentication system includes an encoder coupled to a source of video signals and a source of subscriber data. The encoder generates encoded video signals having at least a portion of the subscriber data encoded in the video signals. An authentication indicating apparatus operable to receive the encoded video signals and to decode the received signals generates an authentication status for the subscriber.

59 Claims, 10 Drawing Sheets

(56) References Cited

U.S. PATENT DOCUMENTS

| | | | |
|---|---|---|---|
| 4,642,682 A | 2/1987 | Orsburn et al. | |
| 4,688,102 A | 8/1987 | Edakubo et al. | |
| 4,691,245 A | 9/1987 | Hickok | |
| 4,745,468 A | 5/1988 | Von Kohorn | |
| 4,789,371 A | 12/1988 | Boggs et al. | |
| 4,807,031 A | 2/1989 | Broughton et al. | |
| 4,876,592 A | 10/1989 | Von Kohorn | |
| 4,926,255 A | 5/1990 | Von Kohorn | |
| 5,034,807 A | 7/1991 | Von Kohorn | |
| 5,214,792 A | 5/1993 | Alwadish | |
| 5,227,874 A | 7/1993 | Von Kohorn | |
| 5,233,423 A | 8/1993 | Jernigan | |
| 5,237,610 A * | 8/1993 | Gammie et al. | 380/228 |
| 5,249,044 A | 9/1993 | Von Kohorn | |
| 5,253,345 A | 10/1993 | Fernandes et al. | |
| 5,262,860 A | 11/1993 | Fitzpatrick et al. | |
| 5,283,734 A | 2/1994 | Von Kohorn | |
| 5,287,181 A | 2/1994 | Holman | |
| 5,301,353 A | 4/1994 | Borras | |
| 5,410,326 A | 4/1995 | Goldstein | |
| 5,423,555 A | 6/1995 | Kidron | |
| 5,443,227 A | 8/1995 | Hsu | |
| 5,461,426 A | 10/1995 | Limberg et al. | |
| 5,467,274 A | 11/1995 | Vax | |
| 5,483,276 A | 1/1996 | Brooks et al. | |
| 5,488,423 A | 1/1996 | Walkingshaw et al. | |
| 5,488,571 A | 1/1996 | Jacobs et al. | |
| 5,500,681 A | 3/1996 | Jones | |
| 5,510,845 A | 4/1996 | Yang et al. | |
| 5,523,794 A | 6/1996 | Mankovitz et al. | |
| 5,526,035 A | 6/1996 | Lappington et al. | |
| 5,535,147 A | 7/1996 | Jacobs et al. | |
| 5,539,471 A * | 7/1996 | Myhrvold et al. | 348/473 |
| 5,550,578 A | 8/1996 | Hoarty et al. | |
| 5,555,024 A | 9/1996 | Limberg | |
| 5,557,333 A | 9/1996 | Jungo et al. | |
| 5,561,467 A | 10/1996 | Takeuchi et al. | |
| 5,577,266 A | 11/1996 | Takahisa et al. | |
| 5,594,493 A | 1/1997 | Nemirofsky | |
| 5,697,844 A | 12/1997 | Von Kohorn | |
| 5,708,476 A | 1/1998 | Myhrvold et al. | |
| 5,734,413 A | 3/1998 | Lappington et al. | |
| 5,737,417 A | 4/1998 | Buynak et al. | |
| 5,739,866 A | 4/1998 | Kim et al. | |
| 5,764,275 A | 6/1998 | Lappington | |
| 5,767,896 A | 6/1998 | Nemirofsky | |
| 5,815,127 A | 9/1998 | Jacobs et al. | |
| 5,831,679 A | 11/1998 | Montgomery et al. | |
| 5,835,388 A | 11/1998 | Helm | |
| 5,880,769 A | 3/1999 | Nemirofsky et al. | |
| 5,907,350 A | 5/1999 | Nemirofsky | |
| 5,953,047 A | 9/1999 | Nemirofsky | |
| 6,016,338 A | 1/2000 | Bansal et al. | |
| 6,023,241 A | 2/2000 | Clapper | |
| 6,038,319 A * | 3/2000 | Chari | 380/33 |
| 6,091,822 A | 7/2000 | Mellows et al. | |
| 6,094,228 A | 7/2000 | Ciardullo et al. | |
| 6,097,877 A | 8/2000 | Katayama et al. | |
| 6,100,883 A | 8/2000 | Hoarty | |
| 6,104,334 A | 8/2000 | Allport | |
| 6,122,610 A | 9/2000 | Isabelle | |
| 6,145,081 A | 11/2000 | Winograd et al. | |
| 6,175,627 B1 | 1/2001 | Petrovic et al. | |
| 6,188,939 B1 | 2/2001 | Morgan et al. | |
| 6,223,348 B1 | 4/2001 | Hayes et al. | |
| 6,229,572 B1 | 5/2001 | Ciardullo et al. | |
| 6,256,019 B1 | 7/2001 | Allport | |
| 6,256,070 B1 | 7/2001 | Frank | |
| 6,330,034 B1 | 12/2001 | Renner et al. | |
| 6,332,193 B1 | 12/2001 | Glass et al. | |
| 6,351,289 B1 | 2/2002 | Chen et al. | |
| 6,385,771 B1 * | 5/2002 | Gordon | 725/90 |
| 6,430,301 B1 | 8/2002 | Petrovic | |
| 6,472,771 B1 | 10/2002 | Frese et al. | |
| 6,510,513 B1 * | 1/2003 | Danieli | 713/156 |
| 6,530,782 B2 | 3/2003 | Fouse et al. | |
| 6,532,038 B1 | 3/2003 | Haring et al. | |
| 6,661,905 B1 | 12/2003 | Chupp et al. | |
| 6,681,160 B2 | 1/2004 | Bidaud | |
| 6,681,328 B1 * | 1/2004 | Harris et al. | 713/175 |
| 6,681,905 B2 | 1/2004 | Edmondson et al. | |
| 6,720,879 B2 | 4/2004 | Edwards | |
| 6,741,790 B1 | 5/2004 | Burgess | |
| 6,792,542 B1 | 9/2004 | Lee et al. | |
| 6,888,943 B1 | 5/2005 | Lam et al. | |
| 6,910,064 B1 * | 6/2005 | Astarabadi et al. | 709/203 |
| 6,947,509 B1 | 9/2005 | Wong | |
| 6,996,251 B2 | 2/2006 | Malone et al. | |
| 7,043,048 B1 | 5/2006 | Ellingson | |
| 7,046,808 B1 | 5/2006 | Metois et al. | |
| 7,155,336 B2 | 12/2006 | Dorfman et al. | |
| 7,184,573 B2 | 2/2007 | Malone et al. | |
| 7,213,254 B2 | 5/2007 | Koplar et al. | |
| 7,460,667 B2 | 12/2008 | Lee et al. | |
| 7,533,266 B2 | 5/2009 | Bruekers et al. | |
| 7,634,076 B2 * | 12/2009 | Lee et al. | 379/231 |
| 7,639,599 B2 | 12/2009 | Van Der Veen et al. | |
| 7,778,440 B2 | 8/2010 | Malone | |
| 7,779,271 B2 | 8/2010 | Langelaar | |
| 7,844,072 B2 | 11/2010 | Van Leest et al. | |
| 7,996,678 B2 | 8/2011 | Kalker et al. | |
| 8,085,935 B2 | 12/2011 | Petrovic | |
| 8,180,098 B2 | 5/2012 | Kalker | |
| 8,259,938 B2 | 9/2012 | Petrovic et al. | |
| 8,452,971 B2 | 5/2013 | Kalker et al. | |
| 8,467,445 B2 | 6/2013 | Celik et al. | |
| 8,538,066 B2 | 9/2013 | Petrovic et al. | |
| 8,601,504 B2 | 12/2013 | Stone et al. | |
| 8,615,104 B2 | 12/2013 | Petrovic et al. | |
| 8,682,026 B2 | 3/2014 | Petrovic et al. | |
| 8,745,403 B2 | 6/2014 | Petrovic | |
| 8,838,977 B2 | 9/2014 | Winograd et al. | |
| 8,838,978 B2 | 9/2014 | Winograd et al. | |
| 8,869,222 B2 | 10/2014 | Winograd et al. | |
| 8,923,548 B2 | 12/2014 | Petrovic et al. | |
| 8,959,202 B2 | 2/2015 | Haitsma et al. | |
| 9,009,482 B2 | 4/2015 | Winograd | |
| 9,106,964 B2 | 8/2015 | Zhao et al. | |
| 2001/0055373 A1 | 12/2001 | Yamashita | |
| 2002/0016674 A1 | 2/2002 | Rudow et al. | |
| 2002/0045987 A1 | 4/2002 | Ohata et al. | |
| 2002/0047921 A1 | 4/2002 | Folio | |
| 2002/0085118 A1 | 7/2002 | Harris et al. | |
| 2002/0112250 A1 | 8/2002 | Koplar et al. | |
| 2002/0168087 A1 | 11/2002 | Petrovic | |
| 2002/0183102 A1 | 12/2002 | Withers et al. | |
| 2003/0014634 A1 | 1/2003 | Petrovic | |
| 2003/0048921 A1 | 3/2003 | Cahill et al. | |
| 2003/0081127 A1 | 5/2003 | Kirmuss | |
| 2003/0087635 A1 | 5/2003 | Sheffield | |
| 2003/0152145 A1 | 8/2003 | Kawakita | |
| 2004/0073916 A1 | 4/2004 | Petrovic et al. | |
| 2004/0117856 A1 | 6/2004 | Barsoum et al. | |
| 2004/0158723 A1 * | 8/2004 | Root | 713/186 |
| 2004/0169581 A1 | 9/2004 | Petrovic et al. | |
| 2005/0196051 A1 | 9/2005 | Wong et al. | |
| 2006/0239501 A1 | 10/2006 | Petrovic et al. | |
| 2006/0239502 A1 | 10/2006 | Petrovic et al. | |
| 2006/0239503 A1 | 10/2006 | Petrovic et al. | |
| 2007/0039018 A1 | 2/2007 | Saslow et al. | |
| 2007/0110237 A1 | 5/2007 | Tehranchi et al. | |
| 2007/0157259 A1 | 7/2007 | Koplar et al. | |
| 2008/0002854 A1 | 1/2008 | Tehranchi et al. | |
| 2010/0046606 A1 | 2/2010 | Celik et al. | |
| 2011/0066723 A1 | 3/2011 | Haitsma et al. | |
| 2011/0280436 A1 | 11/2011 | Kalker et al. | |
| 2012/0017091 A1 | 1/2012 | Petrovic et al. | |
| 2012/0072730 A1 | 3/2012 | Winograd et al. | |
| 2012/0072731 A1 | 3/2012 | Winograd et al. | |
| 2013/0151855 A1 | 6/2013 | Petrovic et al. | |
| 2013/0151856 A1 | 6/2013 | Petrovic et al. | |
| 2013/0152210 A1 | 6/2013 | Petrovic et al. | |
| 2013/0279741 A1 | 10/2013 | Celik et al. | |
| 2014/0032555 A1 | 1/2014 | Kiff et al. | |

(56) References Cited

U.S. PATENT DOCUMENTS

| | | |
|---|---|---|
| 2014/0059591 A1 | 2/2014 | Terpstra et al. |
| 2014/0067950 A1 | 3/2014 | Winograd |
| 2014/0074855 A1 | 3/2014 | Zhao et al. |
| 2014/0075465 A1 | 3/2014 | Petrovic et al. |
| 2014/0075469 A1 | 3/2014 | Zhao |
| 2014/0196071 A1 | 7/2014 | Terpstra et al. |
| 2014/0267907 A1 | 9/2014 | Downes et al. |
| 2014/0270337 A1 | 9/2014 | Zhao et al. |
| 2014/0270340 A1 | 9/2014 | Maas et al. |
| 2014/0279296 A1 | 9/2014 | Petrovic et al. |
| 2014/0325673 A1 | 10/2014 | Petrovic et al. |
| 2014/0376723 A1 | 12/2014 | Petrovic et al. |
| 2015/0019653 A1 | 1/2015 | Terpstra |
| 2015/0030200 A1 | 1/2015 | Petrovic et al. |
| 2015/0043768 A1 | 2/2015 | Breebaart |
| 2015/0121534 A1 | 4/2015 | Zhao et al. |

FOREIGN PATENT DOCUMENTS

| | | |
|---|---|---|
| GB | 2161629 | 1/1986 |
| JP | 2002-330377 | 11/2002 |
| WO | WO-9843158 A1 | 10/1998 |
| WO | WO-9904568 A1 | 1/1999 |
| WO | WO-9934599 A1 | 7/1999 |
| WO | 0051342 | 8/2000 |
| WO | WO-0117262 A1 | 3/2001 |
| WO | WO-02084909 A1 | 10/2002 |
| WO | WO-2005036867 A2 | 4/2005 |
| WO | WO-2005036867 A3 | 4/2005 |
| WO | WO-2005036867 B1 | 4/2005 |

OTHER PUBLICATIONS

International Preliminary Report on Patentability Jan. 18, 2007.
International Search Report and Written Opinion Nov. 27, 2006.
U.S. Appl. No. 10/888,292 Non Final Office Action mailed Apr. 2, 2007, 8 pgs.
U.S. Appl. No. 10/888,292 Response filed Jun. 29, 2007 to non-final office action mailed Apr. 2, 2007, 13 pgs.
U.S. Appl. No. 09/829,223 Final Office Action mailed May 22, 2006, 13 pgs.
U.S. Appl. No. 09/829,223 Non-Final Office Action mailed Aug. 22, 2005, 13 pgs.
U.S. Appl. No. 09/829,223 Notice of Allowance mailed Dec. 15, 2006, 8 pgs.
U.S. Appl. No. 09/829,223 Preliminary Amendment filed Sep. 24, 2003, 14 pgs.
U.S. Appl. No. 09/829,223 Response filed Oct. 27, 2005 to Non-Final Office Action mailed Aug. 22, 2005, 17 pgs.
U.S. Appl. No. 09/829,223 Response filed Aug. 22, 2006 to Final Office Action mailed May 22, 2006, 7 pgs.
U.S. Appl. No. 10/888,292 Preliminary Amendment filed Jan. 24, 2007, 6 pgs.
Chinese Office Action, Application No. 02809778.5, (Apr. 27, 2007),9 pgs.
PBS and TV answer team to bring interactivity to public television, *Transactions—The Source of Information in and around the nations leader in interactive televisions*, (Jun. 1993),9 pgs.
Proceedings from Eleven Technical Sessions, 42nd Annual Convention and Exposition of the National Cable Television Association, Jun. 6-9, 1993, San Francisco, CA, published by NCTA, The National Cable Television Association, (Jun. 1993),6 pgs.
St. Louis Dispatch, Business, Motorola device would connect instantly with the Net,(Jul. 26 2000).
The International Journal of TV, *Interactive Systems Worldwide, Inc.*, (1993),14.
TV Answer—Applications, The Electronic Marketplace—Mondey Manager, Interactive Sports, Catalog Shopping, Grocery Shopping, TV Search and Universal Remote are just a few of the applications TV Answer brings to the viewer's home,(Apr. 1993),30 pgs.
Baer, Walter, Interactive Television—Prospects for Two-Way services on Cable, *R-888-MF, The John and Mary R. Markle Foundation*, (Nov. 1971),98 pgs.
Berman, Bruce M., The Technical Advantages and Application of Digitally-Encoded Video in Fiber Optic Transmission Networks: A Comparative Analysis for Consulting Engineers, End-Users, and System Integrators, *International Fiber Systems, Inc., Revision 1*, (Jun. 14, 2001),1-11.
Gray, Paul R., et al., Algorithms and Components for Data Transmission and Video Encoding, *Department of Electrical Engineering and Computer Sciences, Univerisity of California, Berkeley CA 94720, Final Report for MICRO Project 97-118*, (1997-98),1-6.
Wessel, David, Gadget envy, fom smart cards to video goggles—a global guide to nifty devices, *Wall Street Journal*, 5 pgs.
"TV Answer News Summary", (Feb. 1993),5 pages.
"International Application No. PCT/US02/11118 Article 19 Amendment filed Sep. 12, 2002", 10 pgs.
"International Application No. PCT/US02/11118 Demand filed Feb. 12, 2003", 26 pgs.
"International Application No. PCT/US02/11118 International Preliminary Examination Report mailed Mar. 12, 2004", 7 pgs.
"International Application No. PCT/US02/11118 International Preliminary Examination Report mailed Apr. 1, 2003", 5 pgs.
"International Application No. PCT/US02/11118 Search Report mailed Jul. 12, 2002", 3 pgs.
"International Application No. PCT/US02/11118 Written Opinion mailed Dec. 12, 2002", 7 pgs.
"Notice of Allowance mailed Sep. 20, 2007 in U.S. Appl. No. 10/888,292", NOAR,06.
*Search Report for International Application No. PCT/US04/26855*, (Nov. 27, 2006).
"JP2002-330377 English Translation".

\* cited by examiner

SYSTEMS AND METHODS FOR SUBSCRIBER AUTHENTICATION

CROSS REFERENCE TO RELATED APPLICATION

The present application is a continuation of U.S. patent application Ser. No. 10/888,292 to Alan G. Maltagliati, et al., and entitled "Method and System for Embedding Device Positional Data in Video Signals", filed Jul. 9, 2004 now U.S. Pat. No. 7,330,511, which claims the benefit of U.S. Provisional Application Ser. No. 60/495,902 to Alan G. Maltagliati, et al., and entitled "A Method and System for Embedding Device Positional Data in Video Signals", filed Aug. 18, 2003, which application is herein incorporated by reference and continued preservation of which is requested.

TECHNICAL FIELD

The information disclosed herein relates generally to telecommunications systems and methods, including systems and methods for encoding and decoding information in a video signal.

BACKGROUND

Various methods are presently known for communicating secondary information along with other signal communications modes. For example, the secondary information may be communicated in conjunction with a video signal transmission, so that the secondary information and the video signal may be received by a viewer at a viewing location, which may be used by the viewer in a predetermined manner.

Several known methods transmit secondary information by replacing active portions of the video signal with the secondary information, so that viewers of the video signal may also view observable graphics and/or textual material that is implemented by the secondary information. Still other methods may transmit the secondary information in the non-viewable scan lines of the video signal, such as in the vertical blanking interval (VBI). Accordingly, these scan lines may contain the secondary information, which may include a secondary audio program and/or text and graphical information. One shortcoming present in this approach is that the secondary information may be stripped from the video signal transmission before the signal is viewed. For example, broadcast programming operators may strip the secondary information from the video signals prior to a video broadcast transmission.

Another method for transmitting secondary information in video signals is described in U.S. Pat. No. 4,807,031 to Broughton et al. ("Broughton"), and entitled "Interactive Video Method and Apparatus", which patent is incorporated herein by reference. Broughton relates generally to in-band video broadcasting of commands and other encoded information to interactive devices. Briefly, and in general terms, Broughton discloses an invention related to interactive educational and entertainment systems, and more particularly to television program control of toys that are located in proximity to a television receiver. In order to encode control data capable of providing a benefit to a user, Broughton teaches luminance or chrominance modulation of a video signal so that a composite video signal is created. Accordingly, the composite signal includes a video signal is modulated with control data. The modulation method taught in Broughton alternately raises and lowers a luminance or a chrominance of adjacent horizontal video scan lines to create a video subcarrier that contains the control data. The video signal is therefore not replaced with other data, nor is the data added as a separate signal along with the video signal. Instead, the video signal itself is modulated to carry the control data, so that the control data is a portion of the video signal, or contained within the video signal and yet is imperceptible to the viewer. The Broughton encoding method also includes preview and remove circuitry to ensure suitability, or the presence of data encoding and removal of data encoding, respectively.

Still referring to Broughton, the control data may be transmitted either by television broadcast means, or by a video playback device that is configured to reproduce pre-recorded material on a video display coupled to the device. In either case, the control data may be received by the video display, where at least one video field of the video display may be modulated by the control data. The control data may then be detected using opto-electronic or radio frequency (RF) detection means that are operable to discriminate between the program material and the control data, so that the control data may be detected. The detected control data may then be further reproduced so that the control data may be used with an interactive device.

The modulation method described in Broughton may be improved, as described in detail in U.S. Pat. No. 6,094,228 to Ciardullo, et al. and in U.S. Pat. No. 6,229,572 to Ciardullo et al. (herein after collectively referred to as the "Ciardullo references"). The Ciardullo references disclose methods of modulation that may insert the control data on a visual portion of a video signal by altering the luminance of paired scan lines in opposite directions. The foregoing methods of modulation may thus advantageously allow larger amounts of data to be modulated in the video signal. The Ciardullo references, which are owned by the assignee of the present application, are incorporated by reference herein.

Other related subject matter is disclosed in U.S. patent application Ser. No. 09/489,373, to Edward J. Koplar and Daniel A. Ciardullo, entitled "Interactive Optical Cards and Other Hand-Held Devices with Increased Connectivity", filed Jan. 21, 2000 (referred to hereinafter as "Koplar I"). Koplar I generally relates to various hand-held devices and methods of use involving the reception of auxiliary data from a signal source and providing the user of the hand-held device with various promotional opportunities, such as interactive advertising and gaming, as a result of receiving the auxiliary data. Koplar I is owned by the assignee of the present application, and is also incorporated by reference herein.

Still other related subject matter is disclosed in U.S. patent application Ser. No. 09/829,223, entitled "Universal Methods and Device for Hand-Held Promotional Opportunities", to Edward J. Koplar, Daniel A. Ciardullo, James G. Withers and Christopher E. Chupp, filed Apr. 9, 2001, (referred to hereinafter as "Koplar II"). Koplar II describes additional methods of providing auxiliary data to hand-held devices for the purpose of providing a user of the hand-held device with promotional opportunities, as well as a suitable apparatus that may be used to implement the method. Koplar II is also owned by the assignee of the present application, and is incorporated by reference herein.

Yet still other related subject matter is disclosed in U.S. patent application Ser. No. 10/126,770, entitled "RBDS Method and Device for Processing Promotional Opportunities", to James G. Withers and Alan G. Maltagliati (referred to hereinafter as "Withers I") filed on Apr. 19, 2002. Withers I describes still other improvements to Koplar I and Koplar II, which may include, for example, the transmission of auxiliary data to a hand-held device using the Radio Broadcast Data System (RBDS). Withers I is also owned by the assignee of the present application, and is incorporated by reference herein.

Still another patent application owned by the assignee of the present invention is U.S. patent application Ser. No. 10/676,940, entitled "Method and Apparatus for Modulating a Video Signal With Data", to Yousri H. Barsoum, Alan G. Maltagliati, Daniel A. Ciardullo and Christopher E. Chupp (referred to hereinafter as "Barsoum"), filed on Oct. 1, 2003, which application is incorporated by reference herein. Barsoum discloses the use of a memory card coupled to a slotted hand-held device for receiving video signals by means of the memory card. Signals may be transmitted from the card to the slotted hand-held device. Auxiliary data from the video signals may be decoded on the slotted hand-held device and may provide the user of the slotted hand-held device with a benefit that stems from the reception of the auxiliary data. Barsoum also discloses a method of improving the reliability and speed of the transmission and reception of auxiliary data by storing data in video frames that may be split into multiple fields and that may be encoded in complementary data bits in each field.

Still another patent application owned by the assignee of the present invention is U.S. patent application Ser. No. 10/817,109 entitled "A Method And System Of Transmitting Auxiliary Data From A Digital Display Device", to James G. Withers, Yousri H. Barsoum, Edward J. Koplar and Michael C. Reynolds (referred to hereinafter as "Withers II"), filed on Apr. 2, 2004, which application is incorporated by reference herein. Withers II discloses several methods and suitable systems for modulating auxiliary data, which may be used in conjunction with digital display devices.

To date, however, video signals have not been encoded with data relating to subscriber information that may be used to authenticate the subscriber. Therefore there presently exists a need in the art to include an identification means within video signals communicated to a subscriber to provide for subscriber authentication.

BRIEF DESCRIPTION OF THE DRAWINGS

The various embodiments of the present invention are described in detail below with reference to the following drawings.

DETAILED DESCRIPTION

Many of the various embodiments disclosed relate to systems and methods for embedding subscriber authentication information into video content. Specific details of several embodiments of the invention are set forth in the following description and in FIGS. 1 through 10 to provide a thorough understanding of such embodiments. One skilled in the art, however, will understand that additional embodiments are possible, and that many embodiments may be practiced without several of the details described in the following description. In the description that follows, reference may be made to a subscriber, which may include any individual or organization, such as a business or non-business entity that permissibly receives informational content from a provider. The informational content may include audio and/or video content. Further, the term provider may include any individual or organization, such as a business or non-business entity that provides informational content, which may include audio and/or video content. In addition, the term authenticate (or authentication) generally refers to a confirmation, a validation or substantiation of a subscriber identity, level of service, or other subscriber-related information.

Figure 1:
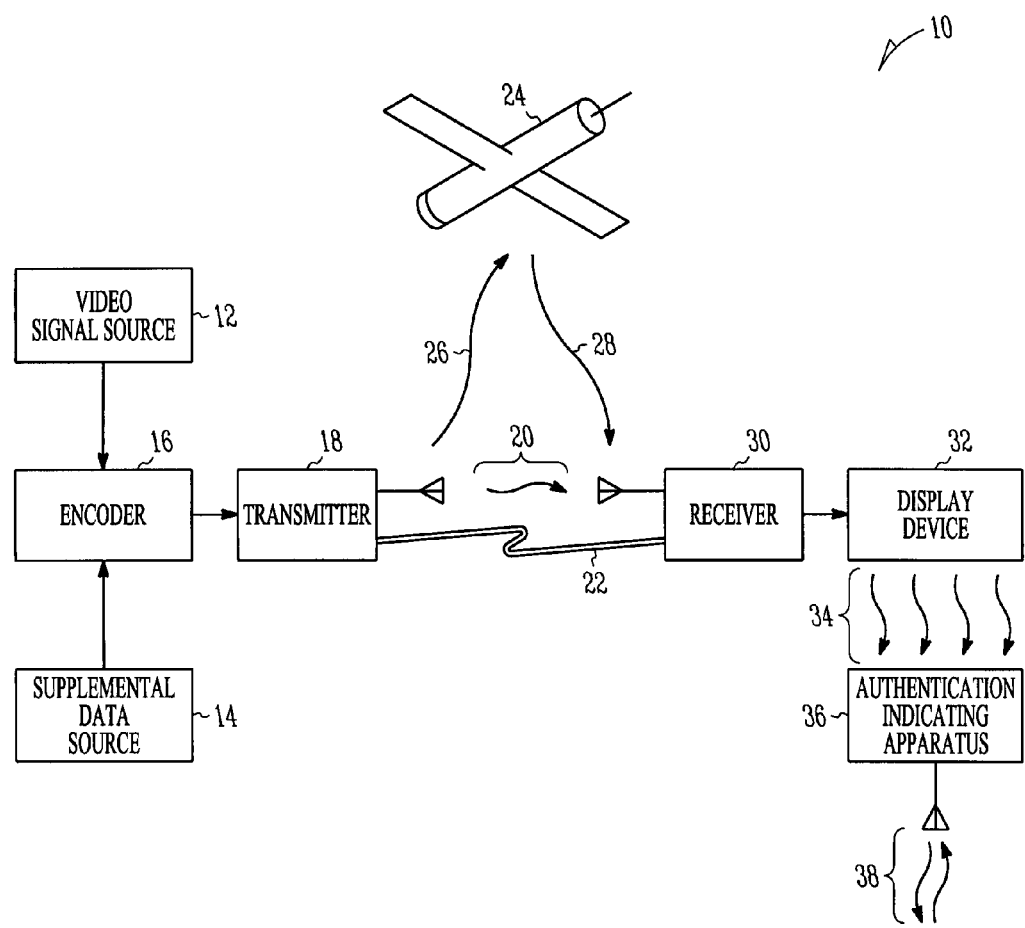
FIG. 1 is a diagrammatic block view of a subscriber authentication system according to the various embodiments.

FIG. 1 is a diagrammatic block view of a subscriber authentication system 10 according to various embodiments of the invention. The system 10 may include a video signal source 12. The video signal source 12 may be configured to provide video signals that are analog signals, or alternately, the video signals may be digitally-based. In either case, the video signals may be received from an optical device configured to generate video signal, such as a video camera, or other similar optical devices operable to view a physical object, and to generate video signals therefrom. Alternatively, the video signal source 12 may include a video reproduction device, such as a video playback device that accepts a video storage medium. Accordingly, the video reproduction device may be configured to reproduce video signals from a magnetic recording medium, such as the well-known Video Home System (VHS) video cassette player. Alternately, the video signals may be digitally-based signals, and the reproduction device may include a magnetic disk drive in a computer system. The video signal source 12 may also include various reproduction devices that are not magnetically-based. For example, optical reproduction systems, such as the known Digital Versatile Disk (DVD) player, which is configured to generate video signals from an optical recording medium, may also be used.

The system 10 may also include a supplemental data source 14, which may include any data that is suitably formatted for encoding in a video signal. Encoding the data in the video signal will be described in greater detail below. In the various embodiments, the supplemental data source 14 may include information relating to subscribers that receive signals from the video signal source 12. Accordingly, the information may include an identifier that uniquely identifies a subscriber and/or a level of service that the subscriber is entitled to receive. For example, the identifier may include a serial number assigned to the subscriber that uniquely identifies the subscriber. If reception of the video signals from the video signal source 12 The serial number may also include a predetermined portion that indicates if the subscriber is authorized to receive the video signals in a commercial setting, or if the subscriber is authorized to receive the video signals in other settings, such as within a residential home. Alternately, blocks of serial numbers may be dedicated to subscribers in different settings. For example, a first block of identifiers may be assigned to commercial subscribers, while a second block of serial numbers may be assigned to other settings, such as residential subscribers.

The system 10 may further include an encoder 16 that is configured to receive data from the supplemental data source, and to receive video signals from the video signal source 12, and to suitably encode the supplemental data into video signals. Briefly, and in general terms, the supplemental data is encoded into the video signals by modulating the video signals with the supplemental data to generate modulated video signals. The encoder 16 will be discussed in greater detail below.

The modulated video signals may be communicated to a transmitter 18 that is operable to wirelessly communicate the modulated video signals by means of an electromagnetic radiation emission 20, and/or by means of a transmission line 22, such as a waveguide, or a coaxial transmission line. Additionally, the modulated video signals may be communicated to a communications satellite 24 that is configured to receive the emission 20 as an uplink component 26, and to further communicate the emission 20 as a downlink component 28. In any case, the emission 20 is communicated to a receiver 30 that is suitably configured to receive the emission 20. For example, the receiver 30 may include a device that is operable to receive audio and video signals in a range of frequencies between approximately 54 MHz and 220 MHz (e.g., a VHF television receiver) and/or a device to receive audio and video signals in a range of frequencies between approximately 470 MHz and 890 MHz (e.g., a UHF television receiver). Alternately, the receiver 30 may include one or more frequency conversion stages in a "front end" portion of the receiver 30 to provide a desired frequency to subsequent receiving stages. The receiver 30 transfers suitably processed video signals to a visual display device 32 that is configured to display the modulated video signals to a viewer. Accordingly, the display device 32 may include a cathode ray tube (CRT) display, a liquid crystal display (LCD), a plasma display, or other known visual display devices. As is well understood, the displayed signals may be communicated to the viewer by visible radiation 34 that is emitted by the visual display device 32.

Still referring to FIG. 1, at least a portion of the visible radiation 34 may be received by a authentication indicating apparatus 36 that includes a suitable decoding device (not shown in FIG. 1) that is operable to decode the supplemental data that is encoded onto the video signals by the encoder 16. The authentication indicating apparatus 36 may also include a variety of indicators and/or displays that may be used to present one or more results of a decoding process to a user of the authentication indicating apparatus 36, as will be described in greater detail below. The authentication indicating apparatus 36 may also be configured to wirelessly communicate the one or more results of the decoding process by means of a wireless link 38.

Although the system 10 shown in FIG. 1 has been described in terms of discrete component portions, it is understood that the various component portions may be combined within a common package. For example, the video signal source 12, the encoder 16 and the transmitter 18 may be confined within a common package. Similarly, the receiver 30 and the display device 22 may be combined within a common device package. Other combinations are possible, and are within the scope of the presently disclosed embodiments.

Figure 1A:
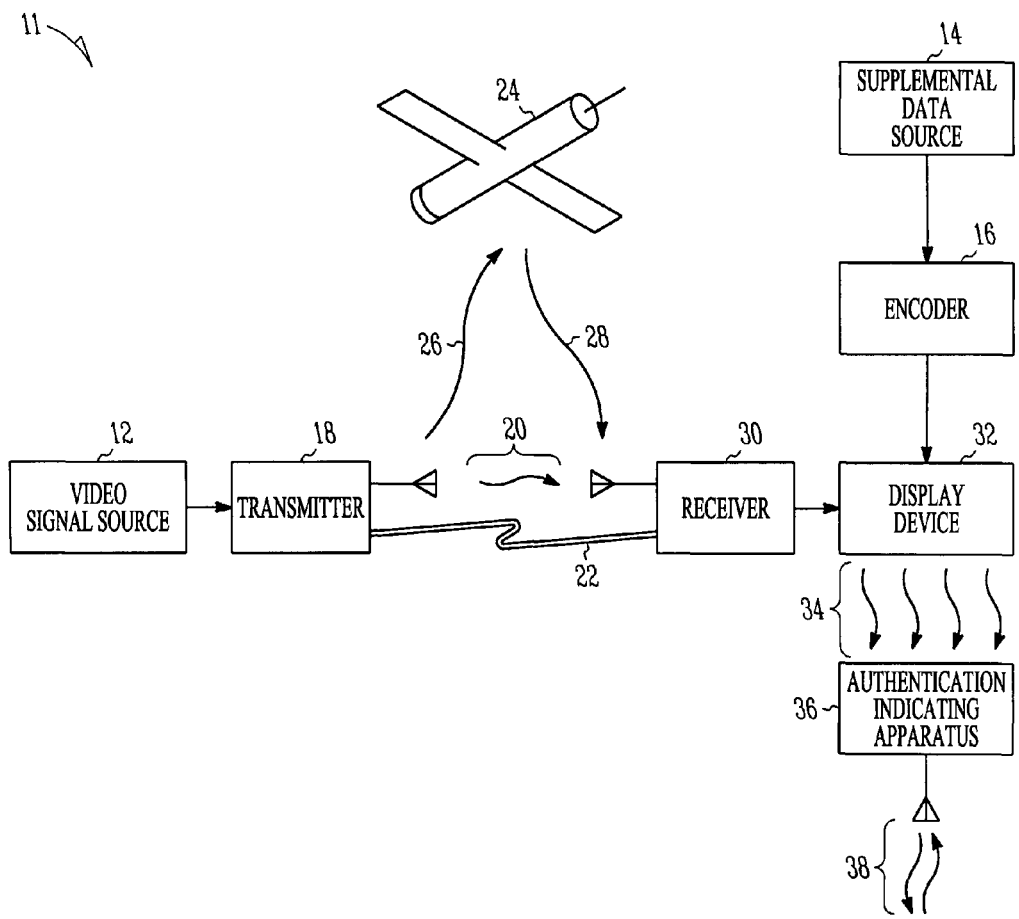
FIG. 1A is a diagrammatic block view of a subscriber authentication system according to the various embodiments.

FIG. 1A is a diagrammatic block view of a subscriber authentication system 11 according to various embodiments of the invention. Many of the components of the subscriber authentication system 11 have been previously described in detail, and in the interest of brevity, will not be described further. The system 11 includes the supplemental data source 14, and the encoder 16 directly communicatively coupled to the display device 32. The supplemental data source 14 may include any data that is suitably formatted for encoding in a video signal that is to be displayed on the display device 32. In the various embodiments, the supplemental data source 14 may therefore include information relating to subscribers that receive signals from the video signal source 12. Accordingly, the supplemental data source 14 may include known devices such as a "satellite box", or a "cable box" that includes an identifier that uniquely identifies the "satellite box" or "cable box". The identifier may therefore uniquely identify a subscriber and/or a level of service that the subscriber is entitled to receive by means of the identifier within the "satellite box" or "cable box". As in other of the various embodiments, the identifier may include a serial number assigned to the subscriber that uniquely identifies the subscriber. The serial number may also include a predetermined portion that indicates if the subscriber is authorized to receive the video signals in a commercial setting, or if the subscriber is authorized to receive the video signals in other settings, such as within a residential home. The encoder 16 receives the data from the supplemental data source 14, and suitably encodes the supplemental data into video signals. In still other of the various embodiments, the authentication device 36 may reside within at least one of the supplemental data source 14, the encoder 16 and the display device 32 so that the authentication device is separately addressable through the wireless link 38. Accordingly, if the identifier provided by the supplemental data source 14 indicates that the subscriber is not entitled to receive a predetermined video content, the authentication device 36 may instruct at least one of the encoder 16, the supplemental data source 14, and the display device 32 to discontinue receiving the video content. For example, the authentication indicating apparatus 36 may be coupled to the receiver and receive the encoded signals, decode selected subscriber data and to compare the subscriber data with a subscriber status. The authentication indicating apparatus 36 may discontinue reception of the video signals if the subscriber data and the subscriber status differ.

Figure 2:
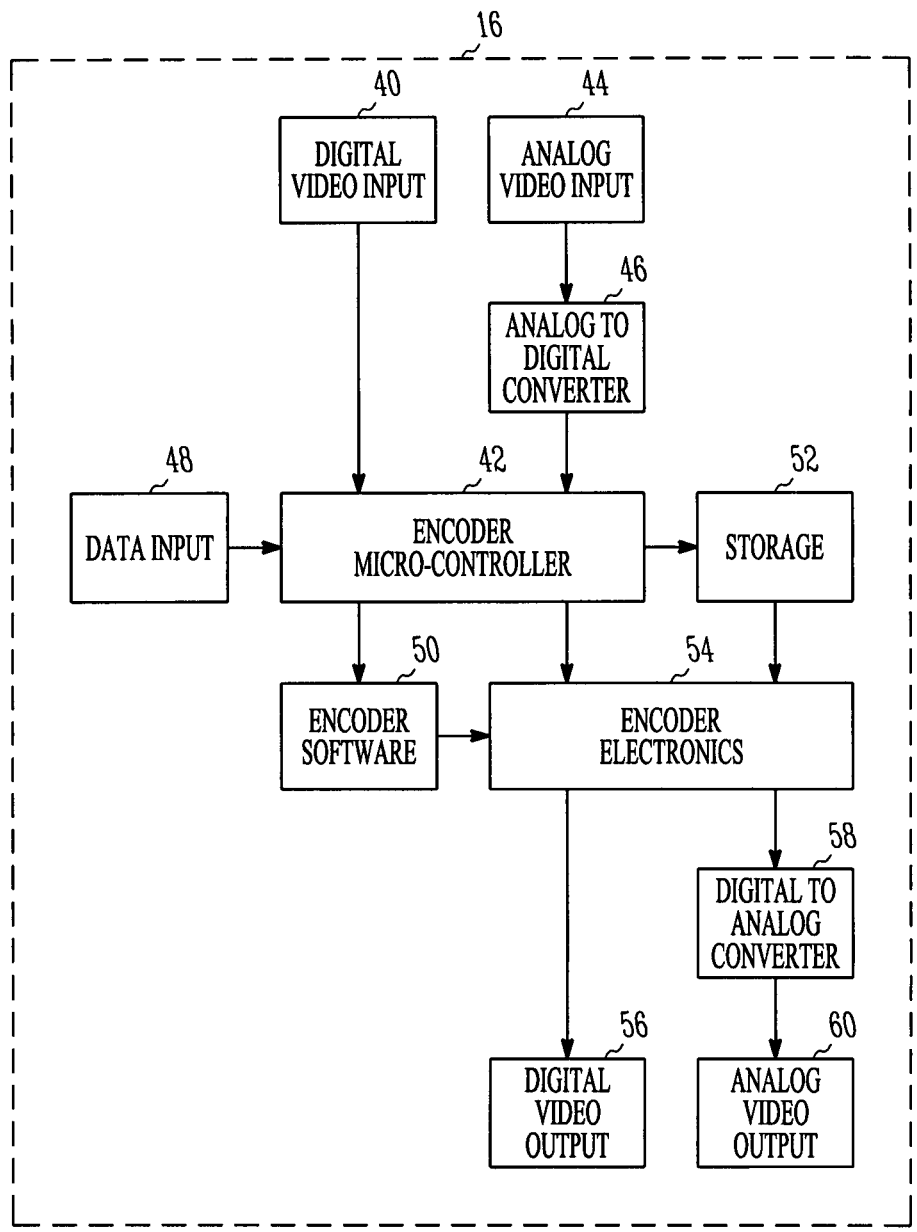
FIG. 2 is a diagrammatic block view of an encoder portion of the system of FIGS. 1 and 1A, according to the various embodiments.

With reference now to FIG. 2, and with continuing reference to FIG. 1, the encoder 16 will now be discussed in greater detail. In accordance with the various embodiments, the encoder 16 includes a digital video input 40 that is operable to receive video signals from the video signal source 12 and to transfer the video signals to an encoder micro-controller 42. The encoder 16 may also receive an analog video signal through an analog video input 44 and routed to an analog-to-digital converter 46. The analog-to-digital converter 46 is operable to digitize the analog video input 44 according to known techniques so that it may be provided to encoder micro-controller 42 for use with the present embodiments. The encoder micro-controller 42 is electronically coupled to one or more data inputs 48. The data inputs 48 may be used to transfer the supplemental data from the source 14. When the encoder micro-controller 42 receives information from one or more data inputs 48 and the video signal 12, encoder software 50 manages further operation of the encoder 16 and directs the encoder micro-controller 42 to store selected information of the video signal 12 in a storage location 52. In the various embodiments, the selected information may include chrominance information and/or luminance information of the video signal 12, although other information may also be stored in the storage location 52. The storage location 52 has sufficient capacity to hold and retain signals (e.g., frames of the video signal 12 and corresponding audio signals) in an electromagnetic form for access by the encoder micro-controller 42. The storage location 52 may be a primary storage location and/or a secondary storage location, and may include storage devices such as a semiconductor memory and/or a mass storage device such as a hard disk drive. An encoder electronics module 54 is responsive to the encoder software 50 and to the encoder micro-controller 42 so that the methods according to the various embodiments, as will be described in greater detail below, modulate the supplemental data 14 into the luminance of video signal 12, thereby creating a modulated video signal. The resulting modulated video signal is then transferred digitally from the encoder 16 by a digital video output module 56, or in an analog form by converting the resulting digital signal with a digital-to-analog converter 58 and outputting the modulated video signal by an analog video output module 60. Although the foregoing description has described both digital and analog video inputs, it is understood that the encoder 16 (and a corresponding decoder positioned within the authentication indicating apparatus 36, as described below) need not include both the digital video input module 40 and the digital video output module 56 in combination with analog video input 44 and analog video output module 60. Accordingly, it is understood that a single selection of inputs and outputs may be employed for the encoder 16.

The encoder micro-controller 54 may include more than one processor and/or microprocessor to manage the various processing and input/output tasks of the various embodiments of the present invention, but may also include a single processor that accomplishes substantially all of the required tasks. Moreover, the electronics and software used by the encoder 16 may exhibit significant differences when incorporated into other pre-existing devices, such as a video camera, for example. The encoder 16 may also include varying degrees of hardware and software, as the various components may be interchangeably embodied in hardware and software.

Figure 3:
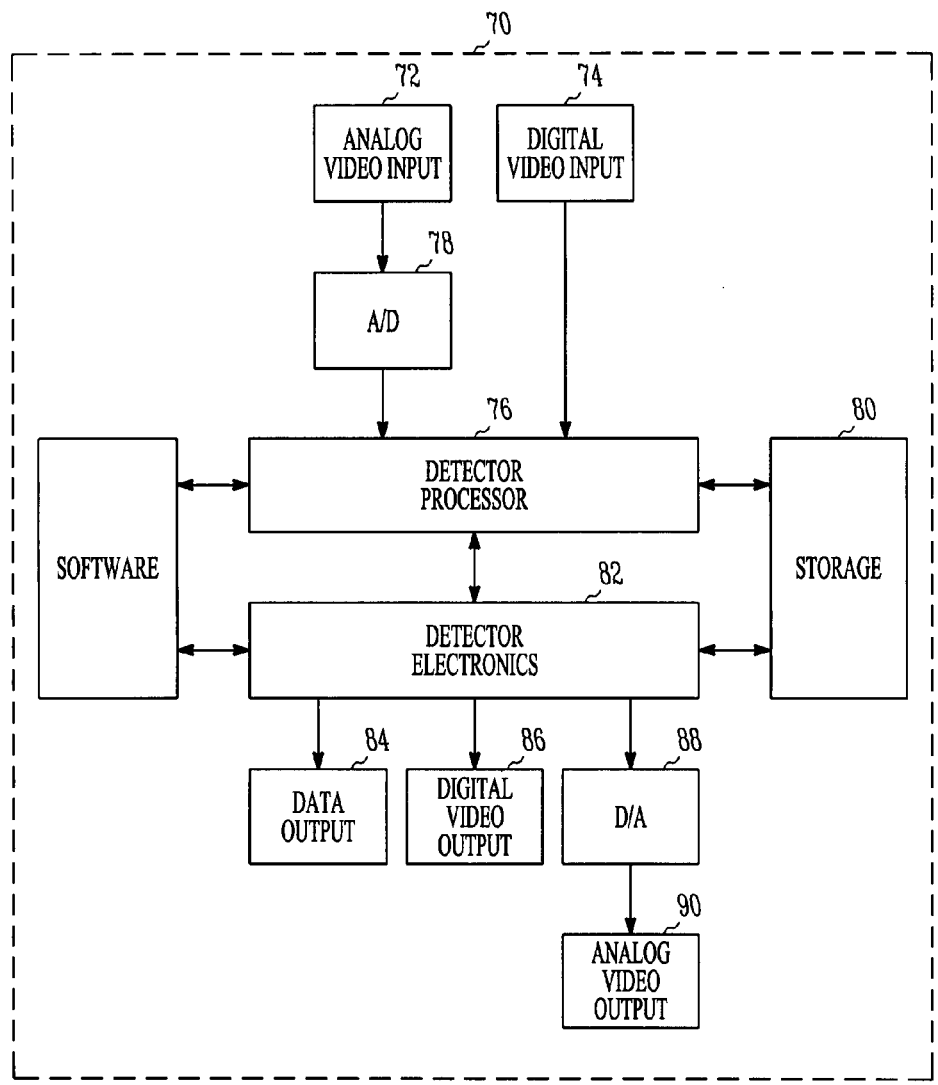
FIG. 3 is a diagrammatic block view of a decoder portion of the system of FIGS. 1 and 1A, according to the various embodiments.

Referring now to FIG. 3, a decoder 70 in accordance with the various embodiments will now be discussed in detail. The decoder 70 is generally incorporated into the authentication indicating apparatus 36 (shown in FIG. 1), and is generally operable to receive the modulated video signal generated by the foregoing encoder 16 by receiving the signal at an analog video input module 72 when the modulated video signal is an analog signal, and by a digital video input module 74 when the modulated video signal is a digital signal. A suitable photo-sensing device may be operably coupled to the decoder 70 so that the respective modules 72 and 74 may receive the signals from a display device 32 (shown in FIG. 1). The digital video input module 74 provides the modulated video signal to a decoder processor 76, while the analog video input 72 may be digitized by use of an analog-to-digital converter 78 before providing the modulated video signal to the decoder processor 76. In accordance with the various embodiments, the decoder processor 76 may store chrominance and/or luminance information of the modulated video signal in a storage module 80, while a decoder electronics module 82 detects scan lines or portions of the modulated video signals that have increased or decreased intensity. The modulated signal may be decoded as provided below.

The supplemental data 14 (shown in FIG. 1) may be transferred from the decoder 70 to a signaling device of the authentication indicating apparatus 36 (to be discussed in detail subsequently) by a data output module 84, and the supplemental data 14 may then be transferred from the data output module 84 to the authentication indicating apparatus 36. The decoder 70 may also output the modulated video signal in a digital format through a digital video output module 86. Since the modulated video signal is in a digital format, the digital signal may be converted to a suitable analog format by a digital-to-analog converter 46, which may then provide the converted signal to an analog video output module 90.

With reference again to FIG. 1, the authentication indicating apparatus 36 will now be discussed in detail. In general, the authentication indicating apparatus 36 according to the various embodiments may receive modulated signals for purposes including, but not limited to the transfer of information, data collection, commercial verification, security, education, and transactions or verifications at points of sale, as well as other commercial, personal, entertainment, or amusement purposes. Data may be transferred to the authentication indicating apparatus 36 by optical and electrical means, although the authentication indicating apparatus 36 may be independent of a specific transmission protocol so that the data may alternatively be sent using other known methods. Data may be received by the authentication indicating apparatus 36 by utilizing a sleeve, cradle, or docking station, and through an optical lens, by use of a PCMCIA or alternate computer port, or by FM, AM, and or other radio frequency means, or other means as may be required based on the type of transmission means selected. Use of the device may allow users to receive, process, and/or store information.

The authentication indicating apparatus 36 may be physically-packaged in a variety of known devices, so that it may assume a variety of "form factors". For example, the device 36 may be a palm-sized device that includes a photo sensor that is operable to receive video signals. In other embodiments, the device 36 may assume a form factor generally resembling a "smart card". Briefly, and in general terms, a smart card is a hand-held, portable device that dimensionally resembles a credit card, but includes a microchip or a microprocessor that is embedded or otherwise incorporated into the smart card. Accordingly, the smart card may be also be referred to as a "finger held" computer, and may typically include a data storage media that ranges from less than approximately a kilobyte up to approximately a megabyte (and possibly more). In other references, smart cards may also be referred to as "chip cards.". A practical example of a device as described above is the commercially-sold hand-held game device for receiving and detecting control data associated with televised program presentations.

While the authentication indicating apparatus 36 may be in the form of a smart card, they may also be in the form of other known hand-held implements such as, for example, mobile telephones, or "cell phones". Recently, mobile telephones phones have become equipped with increased capacity to store and process information, so that many phones now offer limited networking, and even Internet access to a user. Accordingly, mobile telephones, with or without Internet access, may be suitably configured to include the functionality of the authentication indicating apparatus 36 according to the various embodiments. A personal digital assistant ("PDAs") is yet another form of a hand-held implement that may also include the functionality of the authentication indicating apparatus 36. For example, Palm Computing introduced its first PDA called the "Palm Pilot" in 1996. The latest version of the Palm Pilot, Palm VII, was introduced in 1999 and includes wireless Internet access without requiring other peripheral devices, such as a modem. Therefore, for present purposes, the terms "hand-held device" and "card" may be construed to mean any interactive device of a portable character, which may include any hand-held apparatus that may be conveniently carried in the palm by a user, between fingers of the user, or is otherwise intended to be easily grasped and manually handled by the user. In any case, the authentication indicating apparatus 36, upon receiving modulated video content, discriminates the supplemental data from the video program material and may cause a liquid crystal display ("LCD"), or other indicator devices positioned on a face panel of the device 36 to present a selected authentication indication to a user.

Figure 4:
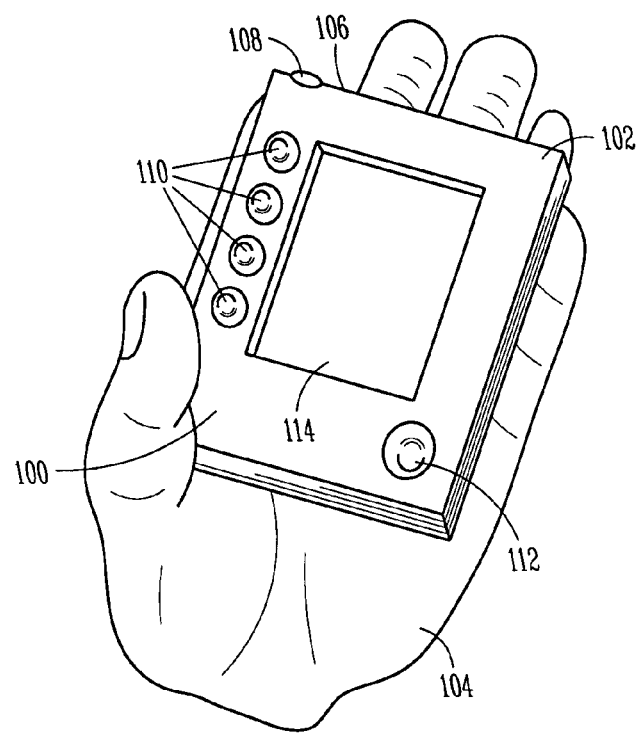
FIG. 4 is an isometric view of an authentication indicating apparatus, in accordance with the various embodiments, which may also be used with the system of FIGS. 1 and 1A.

Referring now to FIG. 4, an isometric view of an authentication indicating apparatus 100 is shown, in accordance with the various embodiments, which may be used with the system 10 of FIG. 1. The device 100 includes a housing 102 that may be conveniently held within a hand 104 of a user. A leading edge 106 of the authentication indicating apparatus 100 may include a lens or small aperture 108 to admit video signals to a photo sensor positioned within the housing 102. Suitable photo sensors may include phototransistors, photodiodes, or other similar photosensitive devices known in the art. One or more light emitting devices 110 may be positioned on a surface of the authentication indicating apparatus 100 that are visible to the user. The one or more light-emitting devices 110 may include light-emitting diodes (LEDs) or other known electro-luminescent light sources, including, for example, regions of a liquid crystal display (LCD) of either the active or passive type. The light emitting devices 110 may be used to provide a variety of device indications to a user, as will be discussed in further detail below. An actuator 112 may be provided that is operable to provide a user response to the authentication indicating apparatus 100. The actuator 112 may include known actuation devices, such as membrane switches, pressure or touch regions that are capable of activation and carrying out the function of the actuator 112. An LCD screen 114 may also be provided on a surface of the authentication indicating apparatus 100 to provide graphical and/or alphanumeric information to the user.

Figure 5:
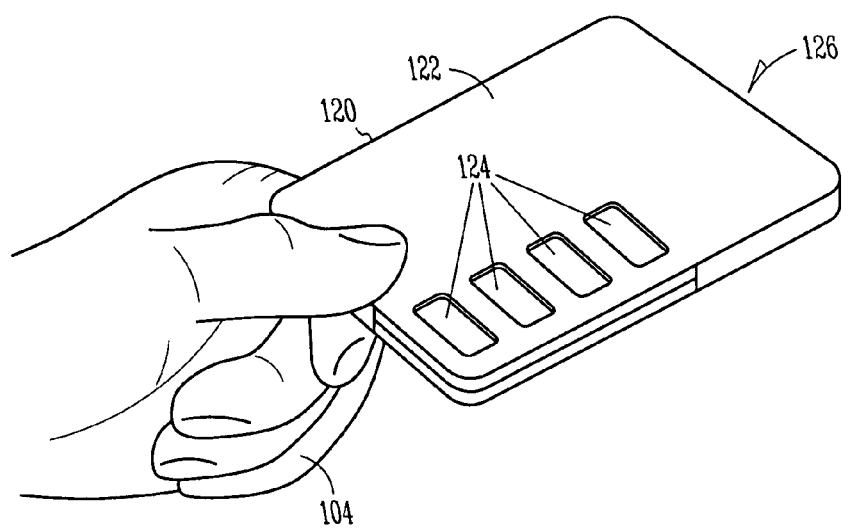
FIG. 5 is an isometric view of another authentication indicating apparatus, in accordance with the various embodiments, which may also be used with the system of FIGS. 1 and 1A.
Figure 6:
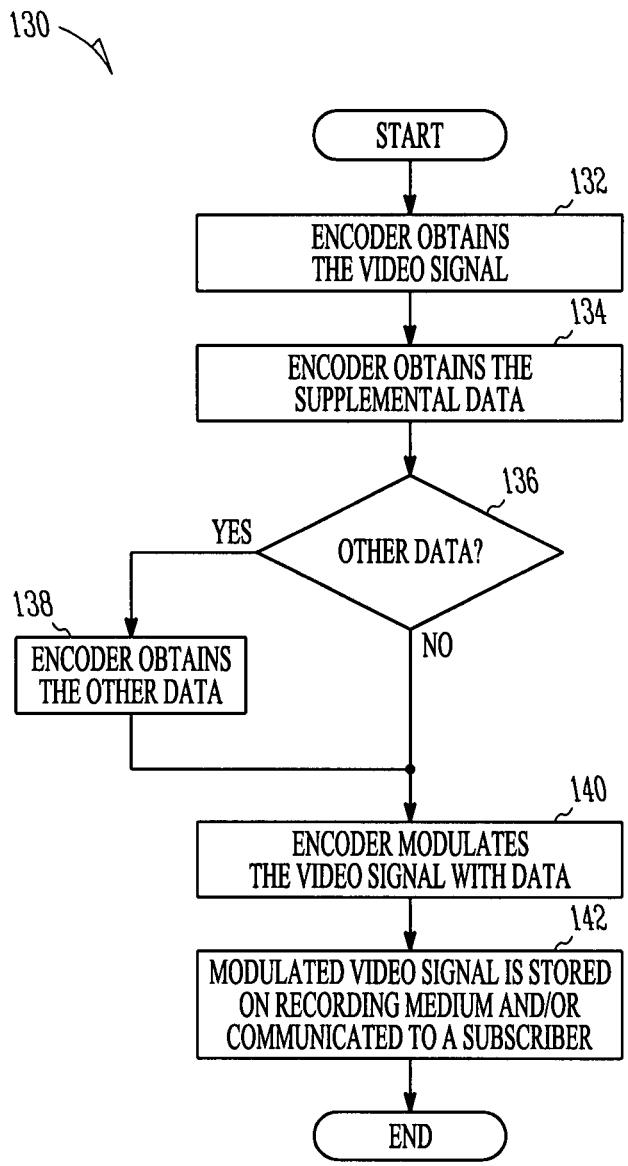
FIG. 6 is a flowchart that describes a method of encoding supplemental data onto a video signal, according to the various embodiments.

FIG. 5 is an isometric view of an authentication indicating apparatus 120, in accordance with the various embodiments, which may also be used with the system 10 of FIG. 1. The device 120 is shown in FIG. 6 is configured to have a form factor that resembles a smart card, particularly with respect to a manner in which it may be held within a hand of a user. Accordingly, the authentication indicating apparatus 120 includes a credit card or wallet-card-sized housing 122. The authentication indicating apparatus 120 also includes a lens or small aperture 126 to admit video signals to a photo sensor positioned within the housing 122. Suitable photo sensing means will be discussed in greater detail below. One or more light emitting devices 124 may be positioned on a surface of the authentication indicating apparatus 120 that are visible to the user. The light emitting devices 124 may be used to provide a variety of device indications to a user, as will be also be discussed in further detail below.

A typical manner in which authentication indicating apparatus 100 or 120 may be used to optically receive encoded data will now be presented. Although the following discussion describes the use of the device 100, it is understood that the device 120 may be interchangeably used. As a user of the apparatus 100 views video content displayed on the display device 32 (as shown in FIG. 1), the user may then hold the authentication indicating apparatus 100 as shown in FIG. 4. The user may then position the authentication indicating apparatus 100 so that the leading edge 106 of the authentication indicating apparatus 100 will be suitably positioned so that the photo sensor may receive video signals from the display device 32 through the aperture 108. The video signals may include a commercial presentation, a television program, a movie, or other video-displayable programs that may be provided to a subscriber. When such a presentation is displayed, devices included in the authentication indicating apparatus 100 (in particular, the decoder discussed above) may then suitably process the video signals and decode portions of the received video signals to provide one or more subscriber-related indications to the user of the device 100. For example, the indications may be presented to the light emitting devices 110 and/or the LCD screen 114 to provide the subscriber information to the user.

FIG. 6 is a flowchart that will be used to describe a method 130 of data encoding (or embedding) supplemental data onto a video signal, according to the various embodiments. The method 130 includes a block 132 where the encoder 16 (as shown in FIG. 1) obtains a video signal from video camera 16, a reproduction device, or other suitable video signal sources. At block 134, supplemental data is obtained from the supplemental data source 14 (as also shown in FIG. 1). As previously described, the supplemental data may include information pertaining to a subscriber authentication. For example, the information may include an identifier that includes an identity of the subscriber and/or a level of service that the subscriber is authorized to receive. At block 136, it is determined if other data is available to be encoded. For example, the other data may include advertising verification and polling, information relating to the transfer of information, commercial verification information, or other information. At block 138, the other data is obtained. At block 140, video signals obtained from the video signal source 12 (FIG. 1) are modulated with the supplemental data and the other data (if any). The modulation is operable to generate a video sub carrier that may be detected by the authentication indicating apparatus 36 (FIG. 1). Accordingly, either a luminance portion or a chrominance portion of the video signal may be modulated. At block 142, the modulated video signal is directly communicated to a subscriber, or transferred to a suitable storage medium for later communication to a subscriber.

Figure 7:
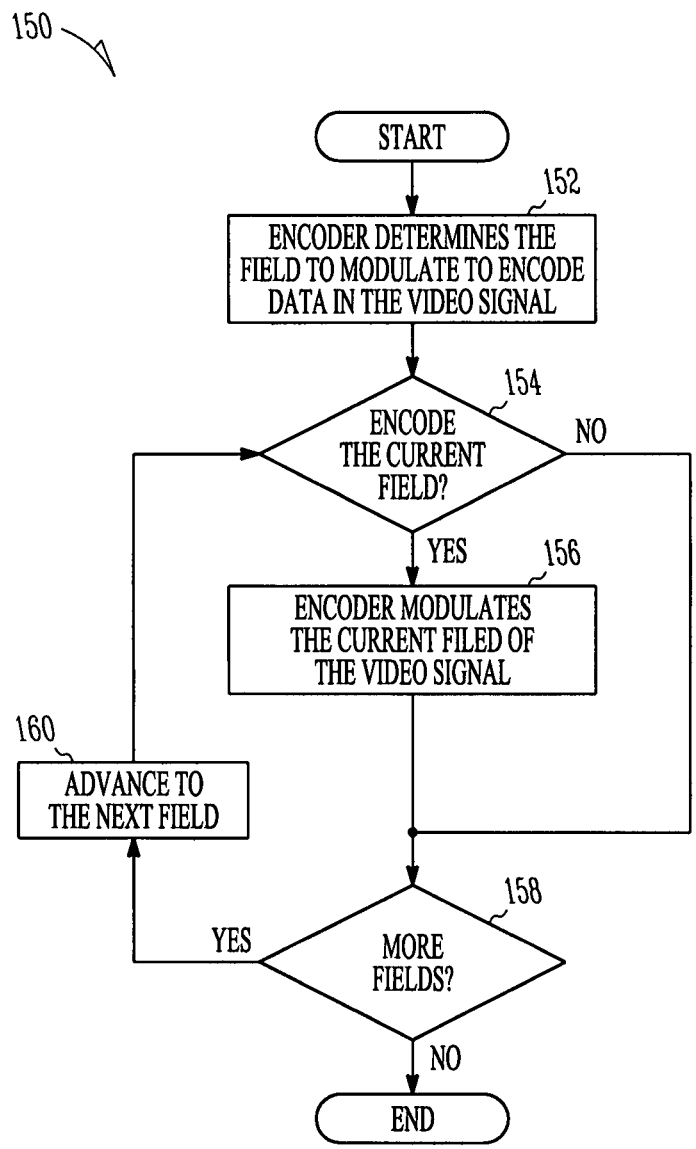
FIG. 7 is a flowchart that describes a method of modulating a video signal, according to the various embodiments.

FIG. 7 is a flowchart that will be used to describe a method 150 of modulating a video signal, according to the various embodiments. The method 130 includes a block 152 where the encoder 16 (as shown in FIG. 1) determines which fields in a video signal are to be modulated so that the supplemental data obtained from the supplemental data source 14 (also shown in FIG. 1) may be encoded within the video signals obtained from the video signal source 12 (also shown in FIG. 1). The fields that may be modulated depends on the encoding method chosen with a particular embodiment of the present invention. In one embodiment, however, the encoding method as disclosed in the Ciardullo references (e.g., U.S. Pat. No. 6,094,228 and U.S. Pat. No. 6,229,572) may be utilized to encode the fields of the video signal in a manner that is not perceptible to a viewer. It should be appreciated, however, that other schemes for encoding data in video signal 18 may also be used. At block 154, the method 150 determines whether it is to encode the current field of the video signal. If yes, then the encoder 16 modulates, at block 156, the current field of the video signal so that it contains a carrier signal representing supplemental data. If no, the method 150 proceeds to block 158. At block 158, the method 150 determines whether there are additional fields of video signal left to encode. If yes, then the encoder 16 advances to the next field in video signal, as shown at block 160, and thereafter returns to block 154. If no, the method 150 terminates.

Figure 8:
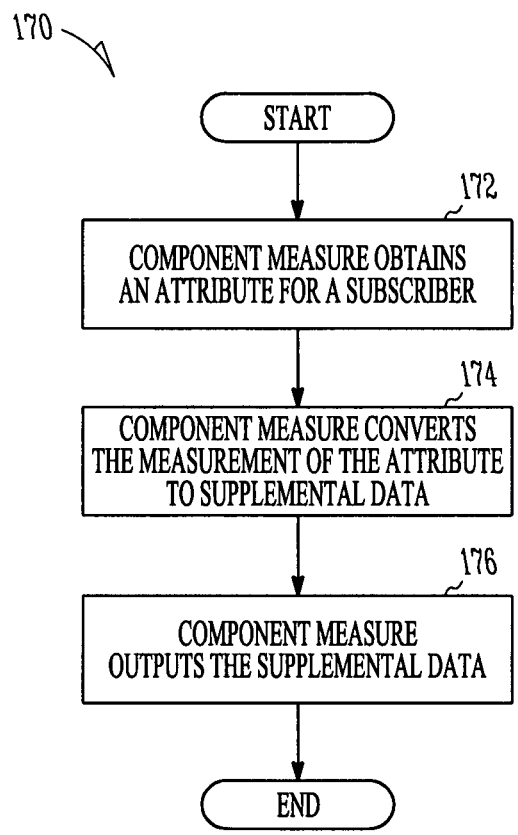
FIG. 8 is a flowchart that describes a method of obtaining supplemental data from a supplemental data source, according to the various embodiments.

FIG. 8 is a flowchart that will be used to describe a method 170 of obtaining supplemental data from a supplemental data source, according to the various embodiments. The method 170 includes a block 172 where an attribute for a subscriber is obtained. Thereafter, at block 174, the attribute is supplied to the supplemental data source 14 (as shown in FIG. 1), such that the attribute may be suitably encoded, as previously described. At block 176, the supplemental data may be provided to the encoder 12.

Figure 9:
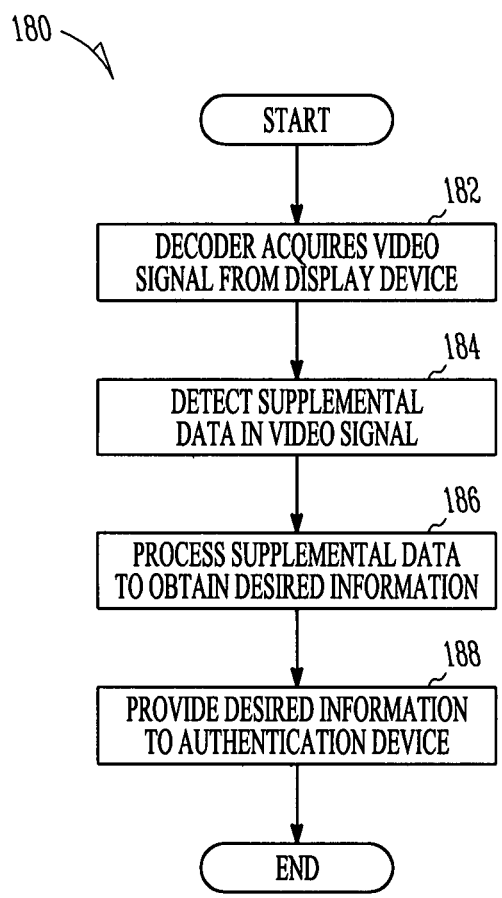
FIG. 9 is a flowchart that describes a method of decoding, according to the various embodiments.

FIG. 9 is a flowchart that will be used to describe a method 180 of decoding, according to the various embodiments. The method 180 includes a block 182 where the decoder, which may include the decoder 70 shown in FIG. 3, obtains the video signal. As previously described, the video signal may be obtained by suitably positioning the authentication indicating apparatus 100 of FIG. 4, or the handheld device 120 of FIG. 5 in proximity to the display device 32 (as shown in FIG. 1). At block 184, the decoder determines if supplemental data has been encoded in the video signal. For example, the supplemental data may be encoded by suitably modulating the data so that one or more sub carriers are generated. At block 186, it is determined whether the carrier signal is present in video signal. If yes, then the decoder obtains the supplemental data from modulated video signal at block 188. The decoder may then distribute the supplemental data in synchronization with modulated video signal, as shown at block 190. At block 192, the method 180 then distributes the decoded video signal to the authentication indicating apparatus (as shown in FIGS. 4 and 5). Based upon the decoded content, which may include an identifier, a determination whether the subscriber is authorized to receive the content may be accomplished.

Figure 10:
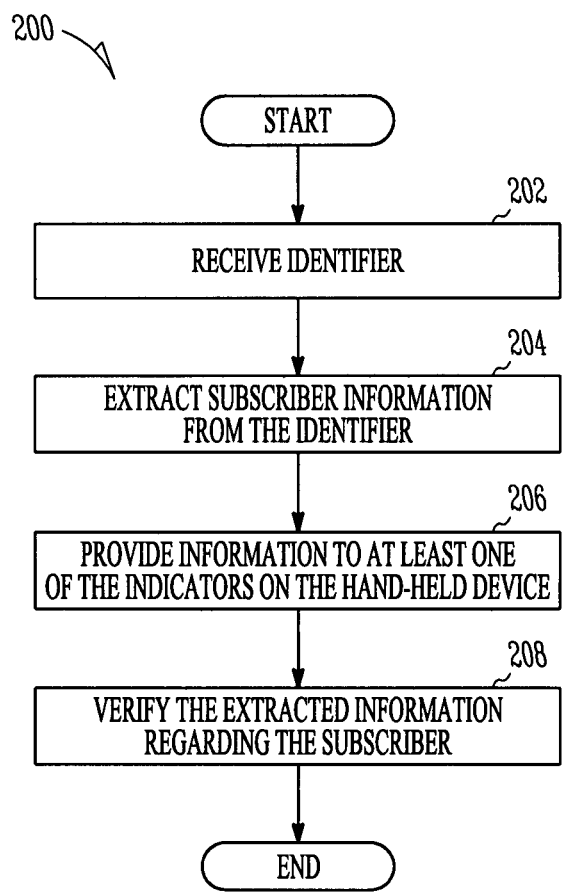
FIG. 10 is a flowchart that describes a method of subscriber authentication, according to the various embodiments.

FIG. 10 is a flowchart that will be used to describe a method 200 of subscriber authentication, according to the various embodiments. The method 200 includes a block 202 where an identifier is received. The identifier comprises at least a portion of the supplemental data, and may include information regarding a subscriber, such as, without limitation, a subscriber identity, a level of service that a subscriber is authorized to receive, a location where the subscriber is authorized to receive the service, or other information related to the subscriber. At block 220, the desired subscriber information is extracted from the identifier. For example, an identity in the form of a name and an address may be provided. Alternately, a level of service that the subscriber is entitled to receive may also be provided, by examining the identifier to determine, for example, if the subscriber is entitled to receive service at a commercial establishment, or if the subscriber is authorized to receive service at a residential location. Accordingly, a predetermined portion of the identifier may be examined that includes information regarding the level of service the subscriber is entitled to receive. For example, if the identifier includes a serial number, then a specific portion of the serial number may be examined to determine a level of service. Alternatively, a block of serial numbers may returned as an identifier, and the returned block may be examined to determine if the block corresponds to commercial subscribers, or to residential subscribers.

Still referring to FIG. 10, at block 206, the method 200 provides the desired subscriber information to at least one of the indication devices on the authentication indicating apparatus. For example, and referring now to the authentication indicating apparatus 100 shown in FIG. 4, a selected one of the light-emitting devices 110 may illuminate if the subscriber is authenticated as valid (e.g., that the subscriber is entitled to receive the service). Additionally, if the subscriber is authenticated as a valid commercial subscriber, then another one of the light-emitting devices 110 may be illuminated. If the subscriber is a valid residential subscriber, still another of the light-emitting devices 110 may be illuminated. Alternately, the LCD screen 114 provided on the authentication indicating apparatus 100 may be used to display alphanumeric and/or graphical information to the user that may be used to authenticate the subscriber.

At block 208, the information provided by the authentication indicating apparatus may be verified, by recourse to documentation available to the user of the authentication indicating apparatus, or by other means. For example, a wireless capability may be provided by the authentication indicating apparatus (as shown in FIG. 1) so that verification information may be wirelessly provided to the authentication indicating apparatus, which may be displayed to the user of the authentication indicating apparatus on the LCD screen 114. Accordingly, in an embodiment, one or more of the light-emitting devices 110 may be illuminated, which indicate an identity, or a level of service for the subscriber, and compared to verifying information that is wirelessly communicated to the authentication indicating apparatus.

While the various embodiments of the invention have been illustrated and described, as noted above, many changes can be made without departing from the scope of this disclosure. For example, although several embodiments of the authentication indicating apparatus are described with reference to the disclosed authentication system, it is understood that the foregoing embodiments may also be used in a wide variety of other contexts, such as commercial-promotional, and entertainment methods and systems, as well as other methods and systems.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features may be grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A subscriber authentication system comprising:
an encoder coupled to a source of video signals and a source of subscriber data that is operable to generate encoded video signals having at least a portion of the subscriber data encoded thereon, wherein the subscriber data encoded on the encoded video signals are imperceptible to a viewer during presentation of the encoded video signals to the viewer; and
an authentication indicating apparatus that is operable to receive the encoded video signals and to decode the encoded video signals that are received to determine an authentication status to at least one of confirm a level of service, validate a level of service, or substantiate a level of service in the video signals that the viewer is authorized to receive using the subscriber data, wherein the authentication indicating apparatus comprises one or more indicating devices positioned on an exterior portion of the apparatus that provide an observable indication of the authentication status for the subscriber.

2. The system of claim 1, wherein the authentication indicating apparatus comprises a photo sensor that receives the encoded video signals.

3. The system of claim 1, wherein the one or more indicating devices comprise at least one of a display or an illumination source.

4. The system of claim 1, wherein the authentication indicating apparatus that is configured to wirelessly communicate with a source of subscriber information.

5. A subscriber authentication system comprising:
an encoder in communication with video signals and subscriber data, the encoder operable to modulate a predetermined portion of the subscriber data onto the video signals to generate a modulated video signal, wherein the subscriber data encoded on the encoded video signals are imperceptible to a viewer during presentation of the encoded video signals to the viewer; and
an authentication indicating apparatus that is operable to receive the modulated video signals and to demodulate the predetermined portion of the subscriber data, the authentication indicating apparatus further operable to use the predetermined portion of the subscriber data to determine an authentication status to at least one of confirm a level of service, validate a level of service, or substantiate a level of service in the video signals that the viewer is authorized to receive using the predetermined portion of the subscriber data, wherein the authentication indicating apparatus comprises one or more indicating devices positioned on an exterior portion of the apparatus that provide a visible indication of the authentication status.

6. The system of claim 5, wherein the authentication indicating apparatus comprises a photo sensor that receives the modulated video signals.

7. The system of claim 5, wherein the one or more indicating devices comprise at least one of a display or an illumination source.

8. The system of claim 5, wherein the authentication indicating apparatus comprises a wireless communications device that is configured to wirelessly communicate with a source of subscriber information.

9. A subscriber authentication system comprising:
a receiver configured to receive encoded video signals that include selected subscriber data and to provide an encoded output displayable on a visual display device, wherein the selected subscriber data are encoded on the encoded video signals and are imperceptible to a viewer during presentation of the encoded video signals to the viewer; and
an authentication indicating apparatus that is operable to receive the encoded output and to decode the selected subscriber data in order to determine an authentication status to at least one of confirm a level of service, validate a level of service, or substantiate a level of service in the encoded video signals that the viewer is authorized to receive using the selected subscriber data, wherein the authentication indicating apparatus comprises one or more indicating devices positioned on an exterior portion of the apparatus that provide a visible indication of the authentication status.

10. The system of claim 9, wherein the receiver is configured to wirelessly receive the encoded video signals from a transmitter.

11. The system of claim 9, wherein the receiver is coupled to a transmitter of the encoded video signals by a transmission line, and the encoded video signals are communicated along the transmission line.

12. The system of claim 9, further comprising an encoder that is coupled to a source of video signals and a source of subscriber data and operable to encode the subscriber data onto the video signals to generate the encoded video signals.

13. The system of claim 9, wherein the authentication indicating apparatus comprises a photo sensor that receives the encoded output.

14. The system of claim 9, wherein the one or more indicating devices comprise at least one of a display or an illumination source.

15. The system of claim 9, wherein the authentication indicating apparatus comprises a wireless communications device that is configured to wirelessly communicate with a source of subscriber information.

16. A method of subscriber authentication, the method comprising:
encoding a selected portion of subscriber data onto a video signal to generate an encoded video signal, the subscriber data representative of an identification of a subscriber authorized to view the video signal, wherein the subscriber data encoded on the encoded video signals are imperceptible to a viewer during presentation of the encoded video signals to the viewer;
communicating the encoded video signal to a display device operable to display the encoded video signals;
decoding the displayed video signals to at least one of confirm a level of service, validate a level of service, or substantiate a level of service in the video signals that the subscriber is authorized to receive using the subscriber data; and
displaying the subscriber data on at least one of a light-emitting device or the display device.

17. The method of claim 16, wherein the subscriber data comprises at least one of a name or an address for the subscriber.

18. The method of claim 16, wherein the subscriber data comprises at least one serial number that is unique to the subscriber.

19. The method of claim 18, wherein the level of service in the video signals is at least one of confirmed, validated, or substantiated by comparing the at least one serial number of the subscriber to a block of plural serial numbers, wherein the level of service is at least one of confirmed, validated, or substantiated when the at least one serial number of the subscriber corresponds to one or more of the serial numbers in the block of plural serial numbers.

20. The method of claim 16, wherein encoding a selected portion of the subscriber data onto the video signal comprises modulating the subscriber data to generate one or more subcarriers on the video signal.

21. The method of claim 20, wherein modulating the subscriber data to generate the one or more subcarriers on the video signal comprises modulating the subscriber data onto at least one of a luminance or a chrominance portion of the video signal.

22. The method of claim 16, wherein communicating the encoded video signal to the display device comprises communicating the encoded video signal using at least one of a wireless radiation emission or a transmission line.

23. The method of claim 16, wherein decoding the displayed video signals comprises optically detecting the subscriber data from the display device.

24. A method of subscriber authentication, the method comprising:
  modulating a selected portion of subscriber data onto a video signal to generate a modulated video signal, wherein the subscriber data modulated onto the video signal are imperceptible to a viewer during presentation of the modulated video signals to the viewer;
  communicating the modulated video signal to a display device operable to display the modulated video signals;
  detecting the selected portion of the subscriber data while the modulated video signal is displayed;
  at least one of confirming a level of service, validating a level of service, or substantiating a level of service in the video signals that the viewer is authorized to receive using the subscriber data that is detected; and
  displaying the generated authentication status on at least one of a light-emitting device or the display device.

25. The method of claim 24, wherein at least one of confirming, validating, or substantiating the level of service includes:
  comparing an identity of the viewer with the subscriber data that is detected; and
  determining if the viewer is entitled to receive the video signal using a result of comparing the identity with the subscriber data.

26. The method of claim 25, wherein comparing an identity of the viewer with the subscriber data further comprises comparing the identity of the viewer with an identifier that is detected in modulated video signal.

27. The method of claim 25, wherein determining if the viewer is entitled to receive the video signal comprises providing an identifier for the viewer.

28. The method of claim 27, wherein providing the identifier for the viewer comprises providing at least one of a name or an address for the viewer.

29. The method of claim 27, wherein providing the identifier for the viewer comprises providing at least one serial number.

30. The method of claim 29, wherein providing the at least one serial number comprises providing a block of serial numbers, wherein at least one of the serial numbers is associated with the viewer.

31. The method of claim 29, wherein providing the at least one serial number comprises providing a block of serial numbers, wherein the block further indicates a service level available to the viewer.

32. The method of claim 24, wherein modulating the selected portion of the subscriber data onto the video signal comprises generating one or more subcarriers on the video signal.

33. The method of claim 24, wherein modulating the selected portion of the subscriber data onto the video signal comprises modulating the subscriber data onto at least one of a luminance or a chrominance portion of the video signal.

34. The method of claim 24, wherein communicating the modulated video signal to the display device comprises communicating the modulated video signal using at least one of a wireless radiation emission or a transmission line.

35. The method of claim 24, wherein detecting the selected portion of the subscriber data while the modulated video signal is displayed comprises optically detecting the subscriber data from the display device.

36. A subscriber authentication system comprising:
  a receiver configured to receive video signals and to combine the video signals with selected subscriber data to generate encoded video signals displayable on a visual display device, wherein the selected subscriber data combined with the video signals are imperceptible to a viewer during presentation of the encoded video signals to the viewer; and
  an authentication indicating apparatus that is operable to receive the encoded video signals and to decode the selected subscriber data from the encoded video signals to at least one of confirm a level of service, validate a level of service, or substantiate a level of service in the video signals that the viewer is authorized to receive, wherein the authentication indicating apparatus comprises one or more indicating devices positioned on an exterior portion of the authentication indicating apparatus that provide a visible indication of the level of service in the video signals that the viewer is authorized to receive.

37. The system of claim 36, wherein the receiver is coupled with a transmitter of the video signals by a transmission line, and the video signals are communicated along the transmission line.

38. The system of claim 36, further comprising an encoder that is coupled to the receiver and a source of the subscriber data, the encoder operable to encode the subscriber data onto the video signals to generate the encoded video signals.

39. The system of claim 36, wherein the authentication indicating apparatus comprises a photo sensor that receives the encoded video signals.

40. The system of claim 36, wherein the one or more indicating devices comprise at least one of the visual display device or an illumination source.

41. The system of claim 36, wherein the authentication indicating apparatus comprises a wireless communications device that is configured to wirelessly communicate with a source of the selected subscriber data.

42. A subscriber authentication system, comprising:
  a transmitter configured to communicate video signals;
  a receiver configured to receive the video signals and to combine the video signals with selected subscriber data to generate encoded video signals displayable on a visual display device, wherein the selected subscriber data combined with the video signals are imperceptible to a viewer during display of the encoded video signals to the viewer; and
  an authentication indicating apparatus coupled to the receiver that is operable to receive the encoded signals, decode the selected subscriber data and compare the subscriber data with a subscriber status, wherein the authentication indicating apparatus is operable to discontinue reception of the video signals if the subscriber data and the subscriber status differ.

43. The system of claim 42, wherein the authentication indicating apparatus comprises a wireless communications device that is configured to wirelessly communicate with a source of the subscriber data.

44. A method of subscriber authentication, the method comprising:
    accessing a video signal having encoded subscriber data that is obtained from a source of supplemental data and that is modulated onto the video signal, wherein the encoded subscriber data are imperceptible to a viewer during presentation of the video signal to the viewer;
    detecting the encoded subscriber data while the modulated video signal is displayed;
    generating an authentication status representative of commercial verification of the viewer using the encoded subscriber data that are detected to at least one of confirm a level of service, verify a level of service, or substantiate a level of service in the video signal that the viewer is authorized to receive; and
    displaying the authentication status that is generated on at least one of a light-emitting device or a display device.

45. The method of claim 44, wherein generating the authentication status comprises:
    comparing an identity of the viewer with the subscriber data; and
    determining if the viewer is entitled to receive the video signal based on comparing the identity with the subscriber data.

46. The method of claim 45, wherein comparing the identity of the viewer with the subscriber data further comprises comparing the identity of the viewer with an identifier that is encoded in the video signal.

47. The method of claim 45, wherein determining if the viewer is entitled to receive the video signal comprises viewing the authorization status.

48. The method of claim 45, wherein determining if the viewer is entitled to receive the video signal comprises obtaining an identifier for the viewer.

49. The method of claim 48, wherein obtaining the identifier for the viewer comprises obtaining at least one of a name or an address for the viewer.

50. The method of claim 48, wherein obtaining the identifier for the viewer comprises obtaining at least one serial number.

51. The method of claim 50, wherein obtaining at least one serial number comprises obtaining a block of serial numbers, wherein at least one of the serial numbers is associated with the viewer.

52. The method of claim 50, wherein obtaining the at least one serial number comprises obtaining a block of serial numbers indicative of the level of service available to the subscriber.

53. The method of claim 44, wherein the encoded subscriber data is detected in a subcarrier portion of the video signal.

54. The method of claim 44, wherein the encoded subscriber data is detected in at least one of a luminance or a chrominance portion of the video signal.

55. The method of claim 44, wherein accessing the video signal comprises optically detecting the encoded subscriber data from a display device.

56. A subscriber authentication system comprising:
    a decoder configured to be operatively coupled to a display device and a receiver of encoded video signals having at least a portion of subscriber data encoded thereon, the subscriber data imperceptibly encoded on the encoded video signals such that the subscriber data are imperceptible to a viewer during presentation of the encoded video signals to the viewer on the display device, the subscriber data representative of a commercial verification of a subscriber of the encoded video signals, wherein the decoder is configured to decode the subscriber data from the encoded video signal to at least one of confirm a level of service, verify a level of service, or substantiate a level of service in the encoded video signals that the subscriber is authorized to view on the display device, wherein the decoder is configured to determine one or more locations where the subscriber is authorized to view the encoded video signals based on the level of service that is at least one of confirmed, verified, or substantiated from the subscriber data.

57. The system of claim 56, wherein the decoder is configured to determine whether the subscriber is authorized to receive the encoded video signals for display on the display device based on the level of service that is at least one of confirmed, verified, or substantiated from the subscriber data.

58. The system of claim 56, wherein the decoder is configured to determine whether the subscriber is authorized to display the encoded video signals on the display device at a business setting based on the level of service that is at least one of confirmed, verified, or substantiated from the subscriber data.

59. The system of claim 56, further comprising an authentication indicating apparatus that includes the decoder, wherein the authentication indicating apparatus is configured to stop receipt of the encoded video signals so that the display device can no longer display the encoded video signals responsive to the level of service indicating that the subscriber does not have authorization to view the encoded video signals on the display device.

* * * * *